3,164,471
PRODUCTION OF IMPROVED FISH PROTEIN
Wilson Monroe Whaley, Chicago, Ill., and Raymond Joseph Moshy, Westport, Conn., assignors to General Foods Corporation, White Plains, N.Y., a corporation of Delaware
No Drawing. Filed Apr. 30, 1962, Ser. No. 191,257
4 Claims. (Cl. 99—18)

This invention relates to an odor-free and aroma-free protein concentrate from fish and more specifically to the production of a deodorized and dearomatized fish protein concentrate of light color from fish having a high oil content.

As is well known, fish have a very high protein content and accordingly may serve as a source of this needed nutrient value. Typically about 20% of the edible portion of most fish is protein. However, it is also well known that fresh fish have substantially little to no shelf life and the possibility of making wide use of this available protein is thus considerably limited.

It has heretofore been believed that conversion of fresh fish to a flour would permit attainment of a protein-containing product which would be suitable for a wide variety of uses. However, the various fish flours which have been prepared are particularly characterized by two prime defects. First, they posses a fishy odor and flavor which renders them unsatisfactory for use in bland products; and second, they have a very short shelf life—after a relatively brief period of time, they become rancid and smelly.

Although in the case of cod or haddock, which contain only 1%–2% oil, it is possible to obtain a fish flour which has an acceptable flavor and a marginally satisfactory shelf life of a few months under the favorable conditions, this has not been possible in the case of fish having a high oil content, typified by menhaden, which has an oil content of 5%–20%, typically 12%.

The advantages of using high oil-content fish, such as menhaden, for use in preparing a high protein fish flour are manifold. Menhaden is the most abundant fish caught in the United States. In 1945, for example, the fisheries of the Middle Atlantic States landed 368.1 million pounds of menhaden fish out of a total catch of all fish of 433.1 million pounds. Thus menhaden represented 85% of all fish caught in that area, and similar percentages are found in other areas. In 1958 approximately two billion pounds of menhaden fish were caught in the United States.

Because of the defects of flour prepared from fish and especially high-oil type fish, such as menhaden, this catch has found its way almost 100%, into animal feed and fertilizer, despite its high protein content and low price. Many attempts have been made to obtain these proteinaceous flours in suitable condition for human food use, but they have been notoriously unsuccessful.

Even the best proteins or flours prepare from low oil fish under the most desirable conditions have found only a limited used despite this high protein content. Their tpical lack of blandness, darkness of color, unsatisfactory shelf life, and the presence of fishy aroma, odor, and taste have prevented them from finding use in food products for human consumption.

It is an object of this invention to provide a technique for treating a high-protein fish flour from fish to remove residual solvent in the fish flour while at the same time reducing or eliminating its fishy odor, aroma, and taste and improving its shelf life.

Other objects will be apparent on inspection of the following description.

According to this invention, a non-bland, solvent-extracted proteinaceous flour prepared from fish and characterized by a fish-like odor, aroma, and taste, and a short shelf life may be treated to remove the solvent and improve these properties by a process which comprises humidifying said non-bland proteinaceous flour and redrying said humidified flour under mild conditions thereby obtaining a white proteinaceous flour characterized by its substantial freedom from solvent, as well as fishy odor, aroma, and taste; by its extended shelf life; and by its bland character.

According to certain more specific aspects of this invention a proteinaceous flour prepared from fish and characterized by a solvent and fish-like odor, taste, and aroma and a short shelf life may be treated to improve these properties by the process which comprises moistening the proteinaceous flour to a moisture content of less than about 30% moisture, and drying said moistened proteinaceous flour at temperature of less than 132° F. to a moisture content less than about 10% thereby obtaining a bland protein product which is substantially free of dark color, odor, taste, and aroma and which is characterized by an extended shelf life.

Typically the proteinaceous flour may be obtained from the raw material, fish, by an extraction operation. Any fish flour may be improved by the process of this invention; however, it finds particular use in the bettering of proteinaceous flours obtained from fish having a high oil content e.g. menhaden, king salmon, mackerel, sardine, herring, tuna, pilchard, etc.

The protein to be treated may have been prepared, for example, by comminuting fish to 16–20 mesh average particle size and then slurrying the fish in water. The slurry may be acidified to a pH of about the mean isoelectric point of the proteins in the fish, and if desired anti-oxidants may be added. The slurry may be heated to 70°–100° C. to denature the protein and it is then filtered. The filter cake, a semi-solid wet cake may, for example, be solvent extracted with isopropyl alcohol or other desired solvent to give a non-solvent soluble crude protein-flour which may contain water and solvent. Part of the solvent may be removed by various techniques including e.g. drying at moderate temperature and preferably under a vacuum.

The wet flour may be partially desolventized at temperatures less than 132° F., preferably 90°–110° F., and preferably under pressure of 5 mm. Hg to 400 mm. Hg, say 25 mm. Hg. Operation at temperature less than about 132° F. minimizes deterioration of flavor components of the flour as well as the tendency of the flour to darken. Vacuum drying under the conditions indicated may be continued to give a product wherein the moisture content has been reduced from the initial level of about 12% down to a level of 2–5%, typically 5%. Of course other mild drying methods may be employed such as air drying, or freeze drying as long as the temperature is kept below 132° F. However, vacuum drying is preferred.

The vacuum-dried flour possesses physical and chemical properties which are generally comparable to the best grades of fish flour available. However, it is characterized by a residual solvent taste and a fishy odor, taste, and flavor, particularly when moistened to form e.g. a dough, which proscribes its use in bland products. The evaluation of the odor and flavor components of the protein-flour may be effected according to several techniques: (a) dry aroma—i.e. by smelling the dry flour; (b) steam aroma—i.e. by mixing the flour with e.g. 10 times its weight of water, boiling, and noting the aroma of the steam; (c) paste taste—i.e. by mixing the flour with about an equal amount of warm water and tasting; and (d) paste aroma—i.e. by smelling the warmed material of test (c). The results of all four of these tests are generally consistent and each test is found to be substantially reproducible in the hands of one skilled-in-the-art; it may be noted however that the dry aroma test is just slightly less sensitive than the other three tests.

The odor or aroma level in these tests is determined and reported on a scale ranging from 1 to 10 whereon 1 represents the minimum level which can be detected, 10 represents the maximum level found in fish, and a level below 5 represents a satisfactory level of blandness.

Treatment of the proteinaceous flour to eliminate the residual fishy odor, taste, and aroma, as well as any residual solvent to obtain a light, bland product may be effected in accordance with this invention by humidification to a moisture level of below 30% and then redrying at a temperature of below 132° F. The partially desolventized fish flour may be moistened from a moisture level of 4% to 12%, say 6-8%. Humidification or remoistening may be effected by adding water in amount sufficient to raise the moisture content to 10-30%, and preferably to 20-25%. When humidification is effected to less than 10%, say to 5%, some improvement is noted as hereinafter described, but full deodorization and dearomatization are not obtained; however, a plurality of "humidifications" to less than 10% e.g. each to 5% can be employed to obtain the desired product. For example, a fish containing 4% moisture may be humidified to about 15%; a fish containing 12% moisture may be humidified to about 30%; and in each case the desired bland product may be obtained. Typically the increase in moisture content during humidification will be at least about 5-6% and preferably about 10-20%.

Humidification to moisture contents above about 30% tends to discolor the otherwise light product and if the humidification be to about 60-80% the product will be very dark in color and unacceptable from a color standpoint. It will be otherwise totally satisfactory with respect to odor, aroma, and taste, and if the lightness or whiteness of color in the fish flour is not essential in the final product, humidification levels of above 30% will be effective in removing solvent and fishy traces while leaving a fish flour of acceptable quality from a flavor standpoint, but of dark color. However, the fish flour should not be humidified to a level of above 100% moisture since high levels of moisture, i.e. water wash and water slurries are not effective in completely removing solvent and odor constituents at below 132° F.

The moistened flour or protein, at the moisture content of below 30%, will be dried under mild conditions, preferably vacuum dried at pressure of 5 mm. Hg to 400 mm. Hg, say 25 mm Hg and at temperature less than 132° F., preferably 90° F. to 110° F., say 100° F. Drying is effected to a moisture content of less than 10% and preferably less than 8%, typically to about 5-8%.

Humidification (including adjusting the moisture content and redrying) may be done once or as many times as desired. Each humidification decreases the amount of odor and aroma. Although commonly one humidification will remove virtually all of the residual flavor, taste, aroma, and odor of the product, two or three humidifications may be employed if desired. Naturally the number of humidifications will depend upon the type of raw material and the degree of purification desired.

The fish protein or fish flour obtained by the process is characterized primarily by a lightness of color and an odor, taste, and aroma which ranges from very faint to non-existent. Even under the least favorable conditions, the color is substantially white, the odor is non-fishy, and it reflects neither the raw material from which it was prepared nor the solvents employed in its preparation. The residual solvent concentration in the product is substantially zero.

Typically the taste of the flour is bland, it is free of undesirable sharp or pungent flavor or aroma notes, and it is nutritionally equivalent to or superior to high quality proteins such as milk or beef protein. The storage life is indefinite and it may be stored for indeterminately long periods. For example in one test at 90° F. and 85% relative humidity (very severe storage conditions) it was unchanged after two months. In comparison, the best product heretofore available when stored 30 days at room temperature and humidity, gave off an odor which was both fish-like and solvent-like in character. Typically the improved fish protein product of this invention may have the following composition on a dry basis: protein 92-98%, typically 95.3%; ash 4-6%, typically 4.57%; fat 0.02-0.4%, typically 0.17%.

On addition to water to form a paste, the new product developed no odor and its taste was bland. The best product heretofore available, when similarly tested, had a distinctly fish-like taste and aroma.

Nutritionally, the product is fully the equivalent of the best protein available on the market and its low cost, high availability, and long storage life make it a uniquely superior product.

Among the uses to which this novel high-quality protein product may be put the following may be noted: (a) as a protein-enriched supplement for (wheat) flour in any and all of its uses including manufacture of bread and cake of the highest quality; (b) in the preparation of a proteinaceous whipping agent; (c) as a protein enrichant in connection with e.g. cereals, etc.; (d) as an adhesive; (e) as a binder, etc.; (f) as a base for protein fibers and films; and (g) as a key protein ingredient in fabricated foods. It may be further modified to provide a wide variety of uses including e.g. specific adhesives, food uses, etc.

*Example I*

In accordance with this example, one hundred pounds of menhaden fish flour were treated. The charge material was characterized by an off-white color, by a non-bland (a blandness rating of 5.5) aroma, taste, and odor, its fishy nature when tested according to the various tests hereinbefore noted. One hundred pounds of this protein which had been prepared by solvent extraction of ground whole fresh menhaden, and which had a moisture content of 6% was mixed with 20.5 pounds of water which raised the moisture content to 22%.

The mixture was passed through a Fitzpatrick mill to ensure homogeneity and it was then dried at reduced pressure in a rotary double cone vacuum drier at 25 mm. Hg. Temperature of the material being dried was maintained at 90°-110° F. until moisture content of 6% was obtained. The protein product had a blandness rating of 3.2 which is comparable to spray-dried egg albumen which has a blandness rating of 3.2. The product was substantially white in color, had very little taste, odor, and aroma and it was substantially completely free of any fishy or solvent-like character when subjected to the hereinbefore-noted tests. It had a very long shelf life. When tested under accelerated storage conditions after two months at 90° F. and 85% relative humidity, the protein still failed to evidence any fishy or solvent-like odor or aroma and it was still substantially as good as it was at the beginning of the shelf life-storage test.

Example II 100 pounds of the protein employed in Example I were humidified as therein described. That product was then rehumidified from 6% moisture up to 22% moisture by addition thereto of 20.5 pounds of water. This humidified protein was dried, as before, in a rotary double cone vacuum drier. The temperature of the material being dried was maintained at 90°–110° F. until moisture content of the product was 6%. This protein was more bland (blandness rating of 3.0) than that prepared by only one rehumidification. It was even more free of fishy or solvent-like character when tested and it had a very long shelf life.

Example III

In this example which illustrates that a single humidifying to less than about 10% will not effect the desired result, the technique of Example I was followed except that the charge protein having 6% moisture was humidified to 9% moisture and otherwise treated as noted. The product was found to be slightly more bland (rating of 4.7) than the starting material (rating of 5.5). On being subjected to the dry aroma test the protein was substantially free of fishy odor and aroma, but when tested by the steam aroma, the paste taste, and the paste aroma test, a residual non-bland character was observed.

Example IV

In this example which illustrates this invention, the technique of Example III was followed and the unsatisfactory product thereof was humidified a second time from 6% to about 9% and dried under the conditions noted. The so-humidified protein was found to be more bland (rating of 4.0) than the product of Example II; it successfully passed the four tests without evidencing any fishy odor or aroma. It had a shelf life of at least two months when stored under accelerated conditions at 90° F. and 85% relative humidity. It was comparable to the product of Example I.

Example V

In this example which illustrates the effect of humidification to higher moisture contents, the technique of Example I was followed except that the protein was humidified to 50% moisture (rather than 22% as in Example I). The product protein obtained was found to be of very dark color, but otherwise met the same tests as did the product of Example I. It had a blandness rating of 3.5.

Example VI

In accordance with this example, fifty pounds of herring fish flour were treated. The charge material was characterized by an off-white color, by a non-bland (a blandness rating of 5.5) aroma, taste, and odor, its fishy nature when tested according to the various tests hereinbefore noted. Fifty pounds of this protein which had been prepared by solvent extraction of ground whole fresh herring, and which had a moisture content of 6% was mixed with 10.25 pounds of water which raised the moisture content to 22%.

The mixture was passed through a Fitzpatrick mill to ensure homogeneity and it was then dried at reduced pressure in a rotary double cone vacuum drier at 25 mm. Hg. The temperature of the material being dried was maintained at 90°–110° F. until moisture content of the product was 6%. The protein product had a blandness rating of 3.2 which is comparable to spray-dried egg albumen which has a blandness rating of 3.2. The product was very light in color, had very little taste, odor, and aroma and it was substantially completely free of any fishy or solvent-like character when subjected to the hereinbefore-noted tests. It had a very long shelf life. When tested under accelerated storage conditions after two months at 90° F. and 85% relative humidity, the protein still failed to evidence any fishy or solvent-like odor or aroma and it was still substantially as good as it was at the beginning of the shelf life-storage test.

Example VII

In accordance with this example, fifty pounds of mackerel fish flour were treated. The charge material was characterized by an off-white color, by a non-bland (a blandness rating of 5.5) aroma, taste, and odor, its fishy nature when tested according to the various tests hereinbefore noted. Fifty pounds of this protein which had been prepared by solvent extraction of ground whole fresh mackerel, and which had a moisture content of 6% was mixed with 10.25 pounds of water which raised the moisture content to 22%.

The mixture was passed through a Fitzpatrick mill to ensure homogeneity and it was then dried at reduced pressure in a rotary double cone vacuum drier at 25 mm. Hg. The temperature of the material being dried was maintained at 90°–110° F., until moisture content of the product was 6%. This protein product had a blandness rating of 3.2 which is comparable to spray-dried egg albumen which has a blandness rating of 3.2. It had a very light color, very little taste, odor, and aroma and it was substantially completely free of any fishy or solvent-like character when subjected to the hereinbefore-noted tests. It had a very long shelf life. When tested under accelerated storage conditions after two months at 90° F. and 85% relative humidity, the protein still failed to evidence any fishy or solvent-like odor or aroma and it was still substantially as good as it was at the beginning of the shelf-like storage test.

Example VIII

As a typical illustration of the use to which this protein product may be put, it was made into a thin (Italian style) waffle, which is commonly made with wheat flour. To obtain a comparison, three runs were made, the first wherein 100% all-purpose wheat flour was employed; the second wherein a mixture of 10% fish flour prepared in accordance with Example I was mixed with 90% wheat flour; and the third wherein the mixture contained 25% fish flour and 75% wheat flour.

In each case, two eggs were placed in a mixing bowl and mixed with 70 ml. of molten vegetable shortening (Crisco), 75 g. of sugar, 0.5 teaspoon of baking powder, and 0.5 teaspoon of vanilla extract flavoring. After mixing at the lowest possible speed for about two minutes, 130 g. of the flour (i.e. the wheat flour or the mixture thereof with fish flour) was added and the mixture assumed a waffle batter-like consistency.

The thick elastic paste was placed in a hot "Italian waffle" iron (which makes thin 0.25-inch waffles) heated on a burner. Cooking time was about 30 seconds, and the product was crunchy in texture.

The waffles containing the fish flour were completely free of fishy taste, fishy aroma, or fishy odor. They were bland, of light color, and had a good texture.

This application is a continuation-in-part of co-pending Serial No. 811,554, filed May 7, 1959, now abandoned.

It will be apparent that many variations may be made in the details of the process and that these variations will fall within the scope of this invention.

What is claimed is:

1. A process for removing solvent from a non-bland, solvent-extracted proteinaceous fish flour characterized by a short shelf-life and a fish-like aroma and taste which comprises humidifying said flour from an initial moisture level of 4% to 12% to a moisture content of 10% to 30% the moisture content of said flour being increased by from 5 to 20 percent during the humidification step and redrying said moistened flour at a product temperature of below 132° F. to a moisture content of 5% to 8% to thereby obtain a bland fish flour characterized by its lightness of color, long shelf-life and substantial freedom from fishy odor.

2. The process of claim 1 wherein the fish flour has an initial moisture level of 6% to 8% and said flour is humidified to a moisture content of 20% to 25%.

3. The process of claim 2 wherein the moistened flour is dried at a product temperature of 90° F. to 110° F. under reduced pressure.

4. The process of claim 3 wherein the fish flour is prepared from a high oil content fish.

References Cited in the file of this patent

UNITED STATES PATENTS

| | | |
|---|---|---|
| 1,442,340 | Hildebrandt | Jan. 16, 1923 |
| 1,561,667 | Schmelzer | Nov. 17, 1925 |
| 2,813,027 | Galliver et al. | Nov. 12, 1957 |
| 2,875,061 | Vogel et al. | Feb. 24, 1959 |